United States Patent [19]

Becker

[11] Patent Number: 4,975,675

[45] Date of Patent: Dec. 4, 1990

[54] DEVICE COMPRISING AT LEAST ONE MAGNETO-RESISTOR CONTAINED IN A HOUSING

[75] Inventor: Helmut Becker, Nuremberg, Fed. Rep. of Germany

[73] Assignee: Standard Elektrik Lorenz Aktiengesellschaft, Stuttgart, Fed. Rep. of Germany

[21] Appl. No.: 288,151

[22] Filed: Dec. 22, 1988

[30] Foreign Application Priority Data

Jan. 14, 1988 [DE] Fed. Rep. of Germany ....... 3800824

[51] Int. Cl.$^5$ ............................................ H01L 43/00
[52] U.S. Cl. .................................................. 338/32 R
[58] Field of Search .......................... 338/32 H, 32 R; 324/117 R, 208

[56] References Cited

U.S. PATENT DOCUMENTS

| 3,777,273 | 12/1973 | Baba et al. | 338/32 R X |
| 4,088,977 | 5/1978 | Bowman et al. | 338/32 R |
| 4,737,710 | 4/1988 | Van Antwerp et al. | 338/32 H X |

Primary Examiner—George H. Miller, Jr.
Assistant Examiner—Marvin M. Lateef
Attorney, Agent, or Firm—Spencer & Frank

[57] ABSTRACT

A device including at least one magnetoresistor for sensing the position of a ferromagnetic part which moves past the magnetoresistor. The magnetoresistor is influenced by a permanent magnet which is mounted near the magnetoresistor in a housing which contains the magnetoresistor. The device is useful as a position, direction, or speed sensor.

18 Claims, 2 Drawing Sheets

A-B

E-F

A-B

C-D

DEVICE COMPRISING AT LEAST ONE MAGNETO-RESISTOR CONTAINED IN A HOUSING

BACKGROUND OF THE INVENTION

The present invention realtes to a device comprising at least one magnetoresistor contained in a housing for sensing the position of a ferromagnetic part moving past the magnetoresistor. The magnetoresistor's resistance is influenced by a permanent magnet.

Such a device is described in Valvo Technische Information 840323. It contains a sensor and a permanent magnet attached to the object that moves past the sensor, the latter consisting of magnetoresistors contained in a housing. To achieve high sensitivity, the distance between the magnetoresistors and the passing part, in this case the permanent magnet, should be small. The short distance makes it necessary for the housing wall protecting the magnetoresistors to be correspondingly thin. However, such a thin wall can be easily dented, thereby destroying the magnetoresistors which are deposited on a fragile substrate on the housing wall.

SUMMARY OF THE INVENTION

It is the object of the present invention to improve the device of the above kind in such a manner that the magnetoresistors are well protected even if the distance between the magnetoresistors and the part passing by is small. Thus, high sensitivity is achieved without the device being easily damaged.

This object is attained by mounting the permanent magnet in the housing near the magnetoresistor it influences. With such a device, sufficient sensitivity is achieved. This is presumably due to the fact that, although the stray field has a low flux density, the field change caused by a part passing by is larger. Because of the greater distance between the magnetoresistor and the part to be detected, the risk of the device being damaged is greatly reduced.

DETAILED DESCRIPTION OF THE PREFERRED EMBODIMENTS

Figure 1:
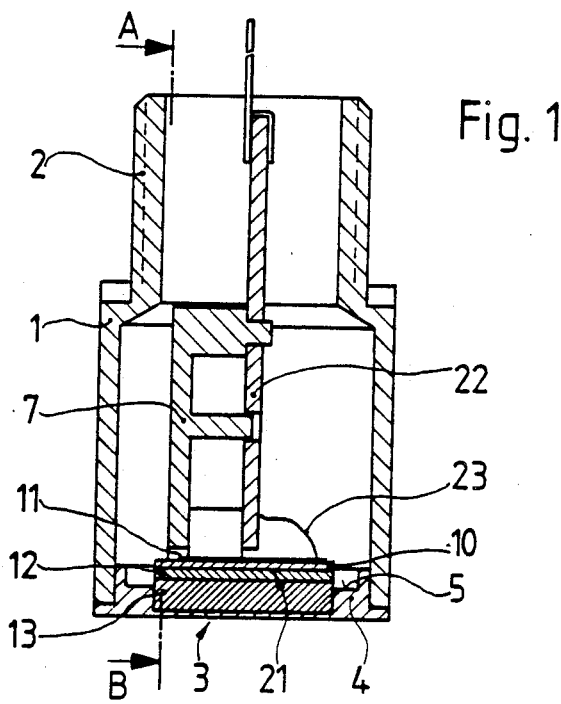
FIG. 1 shows a side view of the device in a section taken along line E-F of FIG. 2.
Figure 2:
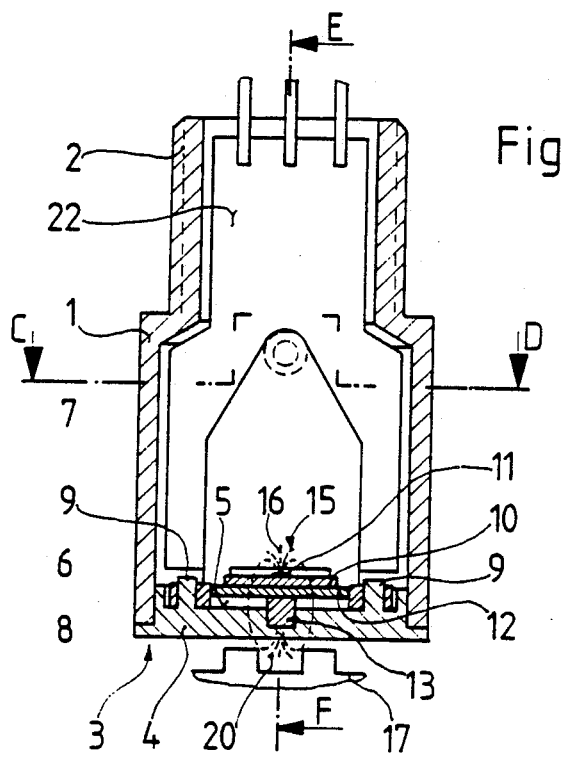
FIG. 2 shows a top view of the device in a section taken along line A-B of FIG. 1.
Figure 3:
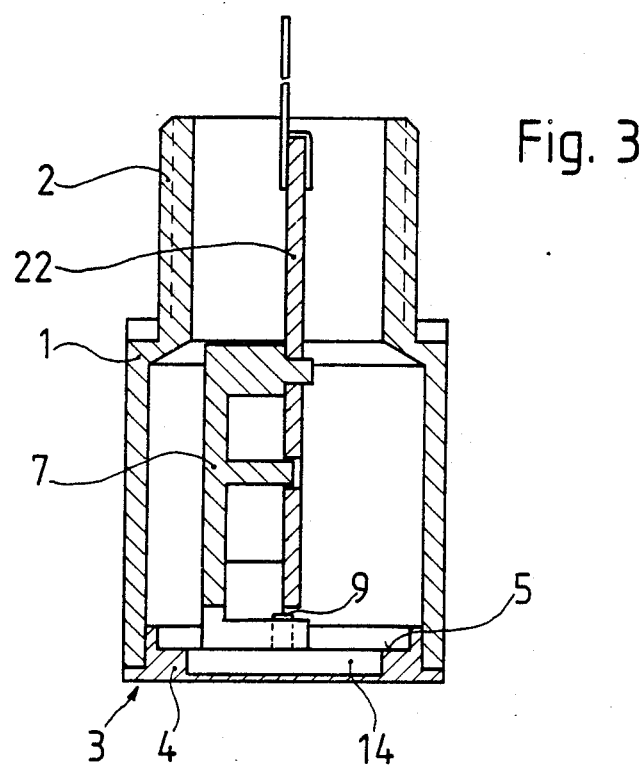
FIG. 3 shows a side view of the device in a section taken along line E-F of FIG. 2, without the magnetoresistor, the spacing plate, and the permanent magnet.
Figure 4:
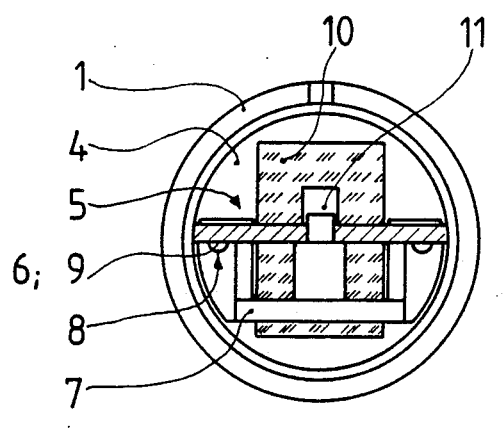
FIG. 4 shows a cross section of the device taken along line C-D of FIG. 2.

As shown in FIGS. 1 to 3, a front panel 4 is mounted in a preferably cylindrical, tubular housing part 1 at the front 3 thereof so as to seal the housing, the housing part 1 having a threaded extension 2 at one end. The front panel 4 may, for example, be snapped into place and/or attached by an adhesive. The inside or rear 5 of the front panel 4 is provided with mounting lugs 6, over which a support 7 provided with holes 8 can be slipped. The two components are rigidly joined together by adhesive bonding or welding and/or by plastic, particularly thermoplastic, deformation of the protruding or projecting ends 9 of the mounting lugs 6.

Between the support 7 and the rear 5 of the front panel 4, at least one magnetoresistor 11 on a substrate 10, a spacing plate 12, and a permanent magnet 13 are arranged one behind the other. The permanent magnet 13 is a bar magnet and is mounted in a recess 14 at the rear 5 of the front panel 4. Instead of the recess, mounting strips or mounting lugs may be provided.

Part of the rear stray field 15 of the permanent magnet 13 passes through the magnetoresistor 11, which assumes a resistance value corresponding to the applied transverse magnetic field, i.e., to a field component perpendicular to the pole center line 16.

Figure 2A:
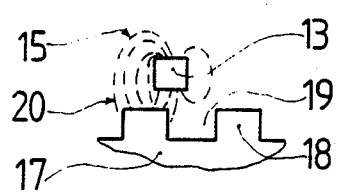
FIG. 2a shows a possible field pattern of the permanent magnet.

A toothed ferromagnetic part 17 moving past the front panel 4 changes the leakage flux when a tooth 18, for example, moves into the range of action of the external stray field 20 instead of a tooth space 19 (cf. FIG. 2a). If a ferromagnetic part is located in the external stray field 20, the transverse component of the rear stray field 15, which contains the magnetoresistor 11, will increase. This causes a change, usually an increase, in the resistance of the magnetoresistor 11.

In FIG. 2, only one strip-like magnetoresistor 11 is present. It is also possible to use two or more magnetoresistors, preferably in a bridge configuration. The width of the permanent magnet 13 is preferably slightly greater than that of the magnetoresistor. The permanent magnet 13 preferably projects beyond the magnetoresistor 11 at the sides by about half the width to the full width of the magnetoresistor.

It has turned out that it is advantageous for the response sensitivity of the sensor if an interspace 21 is present between the bar magnet 13 and the magnetoresistor 11 or the substrate 10. This interspace 21 preferably measures about 0.5 to 2 mm. In the embodiment shown, it is completely filled by the nonmagnetic or diamagnetic spacing plate 12. It may also be filled only partially or not at all.

Mounted on the support 7 is a circuit board 22, such as a printed circuit having electric components soldered thereon or a thick-film circuit. The circuit board 22 is provided with an electronic evaluating circuit. It is conductively connected to the magnetoresistor(s) 11 via leads 23. The terminals 24 of the circuit board 22 protrude from the housing part 1. The latter may be filled from the side of the threaded extension 2 with an insulating compound, preferably an epoxy or polyester resin. A very rugged sensor is thus obtained which can also withstand heavy loads at the front.

I claim:

1. A device for determining the position of ferromagnetic part which moves past a nonmagnetic front panel of said device, said device comprising:
   a housing for containing a magnet and a magnetoresistor;
   a permanent magnet mounted in said housing; and
   at least one magnetoresistor disposed behind said front panel, said magnetoresistor having one pole facing said magnet and a second pole facing away from said magnet, wherein said permanent magnet is disposed between said front panel and said magnetoresistor.

2. The device according to claim 1, further comprising an electric evaluation circuit mounted in said housing.

3. The device as claimed in claim 1, wherein there is an interspace between the permanent magnet and the magnetoresistor.

4. The device as claimed in claim 3, wherein at least part of said interspace is occupied by a spacing plate of nonmagnetizable material.

5. The device as claimed in claim 1, further comprising a support attached to the inside of the front panel by being plugged therein.

6. The device as claimed in claim 5, wherein the inside of the front panel is provided with mounting lugs, and the support is provided with holes corresponding to the mounting lugs.

7. The device as claimed in claim 6, wherein the mounting lugs have protruding ends which extend through the holes, and are deformed.

8. The device as claimed in claim 5, wherein a circuit board is mounted on said support.

9. The device as claimed in claim 1, wherein said housing is filled with a sealing compound.

10. A device comprising:
  a housing for containing a magnetoresistor, said housing including a front panel;
  at least one magnetoresistor for sensing the position of a ferromagnetic part which moves past said front panel; and
  a permanent magnet for influencing said magnetoresistor, said permanent magnet being fixedly mounted in said housing between said magnetoresistor and said front panel.

11. The device according to claim 10, further comprising an electric evaluation circuit mounted in said housing.

12. A device as claimed in claim 10, wherein there is an interspace between said permanent magnet and said magnetoresistor.

13. A device as claimed in claim 12, wherein at least part of said interspace is occupied by a spacing plate of nonmagnetizable material.

14. A device as claimed in claim 10, further comprising a support which is plugged into said front panel.

15. A device as claimed in claim 14, wherein said support includes mounting lugs and the inside of said front panel includes holes for receiving corresponding said lugs on said support.

16. A device as claimed in claim 15, wherein said mounting lugs have protruding portions which extend through said holes and said protruding portions are deformed so that said front panel and said support are rigidly joined together.

17. A device as claimed in claim 14, further comprising a circuit board mounted on said support.

18. A device as claimed in claim 10, wherein said housing is filled with a sealing compound.

* * * * *